(12) United States Patent
Seol et al.

(10) Patent No.: US 11,456,900 B2
(45) Date of Patent: Sep. 27, 2022

(54) DATA RECEIVING DEVICE AND METHOD

(71) Applicant: SAMSUNG ELECTRONICS CO., LTD., Suwon-si (KR)

(72) Inventors: Chang Kyu Seol, Osan-si (KR); Byung-Suk Woo, Changwon-si (KR); Su Cheol Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/371,578

(22) Filed: Jul. 9, 2021

(65) Prior Publication Data

US 2022/0141057 A1     May 5, 2022

(30) Foreign Application Priority Data

Oct. 29, 2020 (KR) .......................... 10-2020-0142237

(51) Int. Cl.
*H04L 25/03* (2006.01)
*H04L 1/00* (2006.01)
*H04L 25/06* (2006.01)
*H04L 1/20* (2006.01)

(52) U.S. Cl.
CPC ...... *H04L 25/03267* (2013.01); *H04L 1/0061* (2013.01); *H04L 1/203* (2013.01); *H04L 25/062* (2013.01)

(58) Field of Classification Search
CPC . H04L 25/03267; H04L 1/0061; H04L 1/203; H04L 25/062
See application file for complete search history.

(56) References Cited

U.S. PATENT DOCUMENTS

| | | | |
|---|---|---|---|
| 7,426,236 B1 | 9/2008 | He | |
| 8,094,707 B1 | 1/2012 | Nammi et al. | |
| 8,098,725 B2 | 1/2012 | Liu et al. | |
| 8,938,035 B1* | 1/2015 | Dai | H03M 13/41 714/796 |
| 9,258,155 B1* | 2/2016 | Riani | H04L 1/004 |
| 9,762,423 B2 | 9/2017 | Baecher et al. | |
| 9,882,706 B1 | 1/2018 | Lugthart et al. | |
| 2021/0218604 A1* | 7/2021 | Wu | H04L 25/03885 |

FOREIGN PATENT DOCUMENTS

KR     1020020069721     9/2002

* cited by examiner

*Primary Examiner* — Janice N Tieu
(74) *Attorney, Agent, or Firm* — F. Chau & Associates, LLC

(57) ABSTRACT

Provided are a data receiving device and a corresponding method for receiving the data. The data receiving device comprises a path control logic configured to store L symbol paths, where L is a natural number equal to or greater than 2, L feedback filters configured to calculate L inter-symbol interferences (ISI) for the L symbol paths, respectively, L operators configured to remove the L inter-symbol interferences from an output of a feed-forward equalizer, and a path metric calculator configured to receive outputs of the L operators and calculate a path metric for each of the L symbol paths, wherein the path control logic is configured to select L values among the calculated path metrics for the L symbol paths to update the L symbol paths.

20 Claims, 5 Drawing Sheets

DATA RECEIVING DEVICE AND METHOD

CROSS-REFERENCE TO RELATED APPLICATION

This application claims priority under 35 U.S.C. § 119 to Korean Patent Application No. 10-2020-0142237 filed on Oct. 29, 2020 in the Korean Intellectual Property Office, the disclosure of which is herein incorporated by reference in its entirety.

TECHNICAL FIELD

The present disclosure relates to a data receiving device and method for receiving the data.

DISCUSSION OF RELATED ART

Research was conducted on technology for removing inter-symbol interference (ISI) experienced by a signal or data received through a wireless communications channel. An equalizer may be applied to promote reliability, such as but not limited to a low bit error rate (BER), of a multi-level signal received through the wireless communications channel

SUMMARY

Embodiments of the present disclosure provide a data receiving device capable of improving the detection accuracy of a unit symbol transmitted by a transmission device without excessively increasing the computational load of the reception device.

Embodiments of the present disclosure also provide a data receiving method capable of improving the detection accuracy of a unit symbol transmitted by a transmission device without excessively increasing the computational amount of the reception device.

According to an embodiment of the present disclosure, a data receiving device includes: path control logic configured to store L symbol paths, where L is a natural number greater than or equal to 2; L feedback filters configured to calculate L inter-symbol interferences (ISI) for the L symbol paths, respectively; L operators configured to remove the L inter-symbol interferences from an output of a feed-forward equalizer; and a path metric calculator configured to receive outputs of the L operators and calculate a path metric for each of the L symbol paths, wherein the path control logic is configured to select L values among the calculated path metrics for the L symbol paths to update the L symbol paths, respectively.

According to an embodiment of the present disclosure, a data receiving device includes: a feed-forward equalizer configured to receive a multi-level signal through a channel; and a list-decision feedback equalizer configured to generate a restored multi-level signal using an output of the feed-forward equalizer, wherein the list-decision feedback equalizer calculates inter-symbol interferences (ISI) respectively for L symbol paths, where L is a natural number equal to or greater than 2, wherein after removing the L inter-symbol interferences from the output of the feed-forward equalizer, the list-decision feedback equalizer calculates a path metric for each of the L symbol paths, and wherein the list-decision feedback equalizer generates the restored multi-level signal by repeating an operation of selecting L values among the calculated path metrics for the L symbol paths to update the L symbol paths.

According to an embodiment of the present disclosure, a data receiving method includes: storing L symbol paths, where L is a natural number equal to or greater than 2; calculating L inter-symbol interferences (ISI) for the L symbol paths, respectively; calculating a path metric for each of the L symbol paths after removing the L inter-symbol interferences from an output of a feed-forward equalizer; and selecting L values among the calculated path metrics for the L symbol paths to update the L symbol paths.

However, embodiments of the present disclosure are not restricted to those set forth herein. The above and other embodiments of the present disclosure will become more apparent to those of ordinary skill in the art to which the present disclosure pertains by referencing the detailed description of the present disclosure given below.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

Hereinafter, embodiments of the present disclosure will be described with reference to the accompanying drawings.

Figure 1:
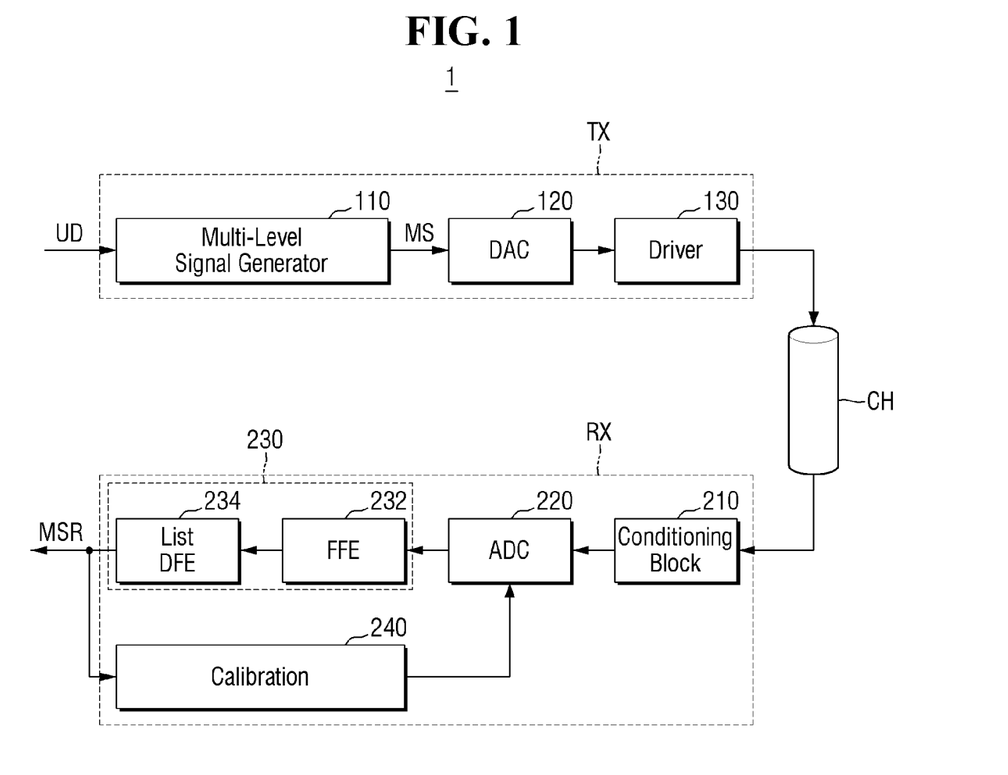
FIG. 1 is a block diagram of a data transmission and reception system according to some embodiments.
Figure 2:
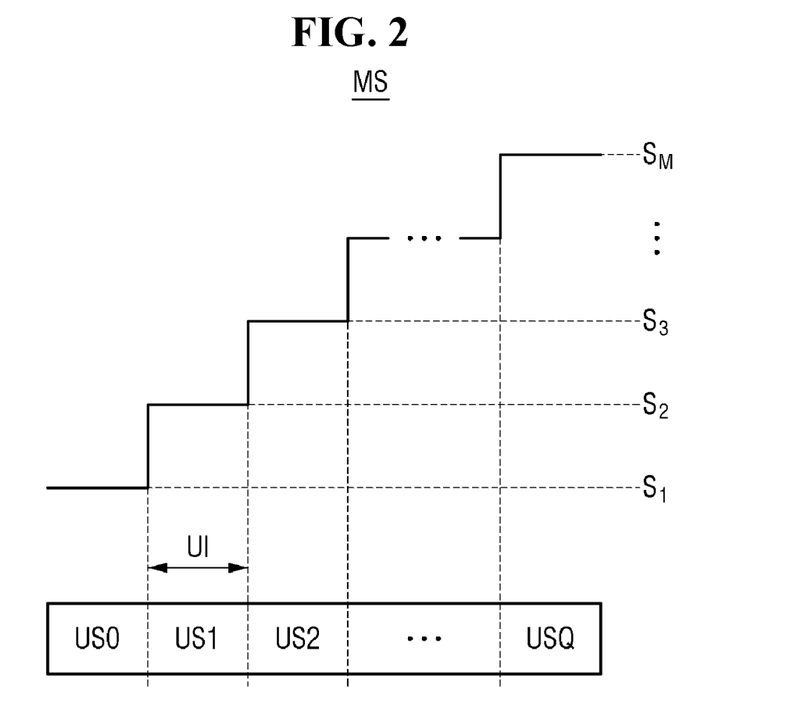
FIG. 2 is a graphical diagram describing a multi-level signal generated by a multi-level signal generator of FIG. 1.

FIG. 1 illustrates a data transmission and reception system according to some embodiments. FIG. 2 is a diagram describing a multi-level signal generated by a multi-level signal generator of FIG. 1.

Referring to FIG. 1, a data transmission and reception system 1 may include a transmission device TX and a reception device RX.

The transmission device TX may generate a multi-level signal MS from user data UD that is in the form of a digital signal. In addition, the transmission device TX may convert the multi-level signal MS into an analog signal and transmit it to the reception device RX through a channel CH.

The transmission device TX of the data transmission and reception system 1 may include a multi-level signal generator 110, a digital-to-analog converter 120, and a driver 130. In some embodiments, the transmission device TX may further include like and additional components without limitation.

The multi-level signal generator 110 may generate the multi-level signal MS from the user data UD that is in the form of a digital signal.

Referring to FIG. 2, the multi-level signal MS may include a plurality of unit symbols US0 to USQ.

One unit symbol US is maintained during a unit period UI. In the present embodiment, one unit symbol US may have any one of M signal levels S1 to SM, where M is a natural number equal to or greater than 2.

For example, in some embodiments, the multi-level signal MS may include the unit symbol US0 having the signal level S1, the unit symbol US1 having the signal level S2 following the unit symbol US0, the unit symbol US2 having the signal level S3 following the unit symbol US1, and the unit symbol USQ having the signal level SM.

In addition, in some embodiments, the multi-level signal MS may include the unit symbol US0 having the signal level S2, the unit symbol US1 having the signal level S1 following the unit symbol US0, the unit symbol US2 having the signal level SM following the unit symbol US1, and the unit symbol US3 having the signal level S1 following the unit symbol US2.

That is, the multi-level signal MS may be defined as a set of consecutive unit symbols US0 to USQ, each having any one of the M signal levels S1 to SM.

Referring back to FIG. 1, the digital-to-analog converter 120 may convert the multi-level signal MS into an analog signal. The driver 130 may perform tasks to transmit the converted analog signal from the digital-to-analog converter 120 to the reception device RX through the channel CH.

The analog signal may be transmitted from the transmission device TX to the reception device RX through the channel CH. In the signal transmitted to the reception device RX through the channel as described above, inter-symbol interference (ISI) depending on the characteristics of the channel CH may exist. That is, the signal transmitted to the reception device RX may include noise due to the inter-symbol interference in addition to data, i.e., in addition to the unit symbols US that the transmission device TX intended to transmit.

The reception device RX may remove the inter-symbol interference from the signal transmitted from the transmission device TX to generate a restored multi-level signal MSR in which the unit symbols US of the multi-level signal MS that the transmission device TX intended to transmit have been restored.

The reception device RX of the data transmission and reception system 1 may include a conditioning block 210, an analog-to-digital converter 220, an equalizer 230, and a calibration block 240. In some embodiments, the reception device RX may further include like and additional components without limitation.

The conditioning block 210 may perform analog conditioning processing on a signal received through the channel CH. The analog-to-digital converter 220 may convert the conditioned analog signal into a digital signal.

The equalizer 230 may receive the output of the analog-to-digital converter 220 to generate the restored multi-level signal MSR from which the inter-symbol interference generated in the channel CH has been removed. To this end, the equalizer 230 may include a feed-forward equalizer (FFE) 232 and a list-decision feedback equalizer (List DFE) 234. This will be described in more detail later. The calibration block 240 may perform a calibration operation required to generate the restored multi-level signal MSR.

Figure 3:
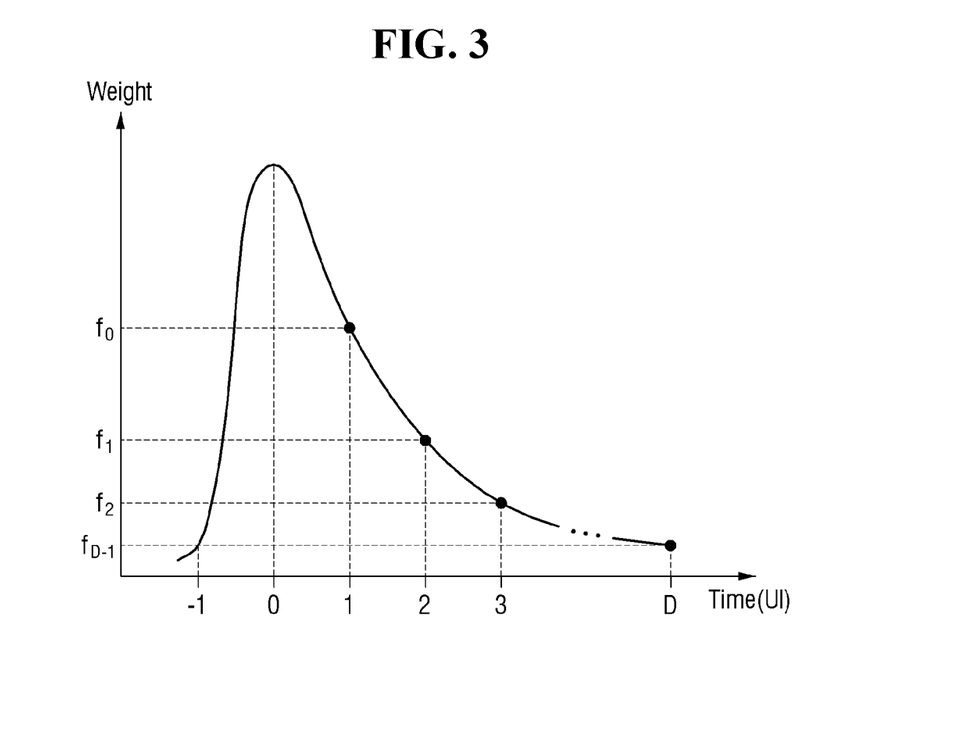
FIG. 3 is a graphical diagram showing the characteristics of a channel of FIG. 1.
Figure 4:
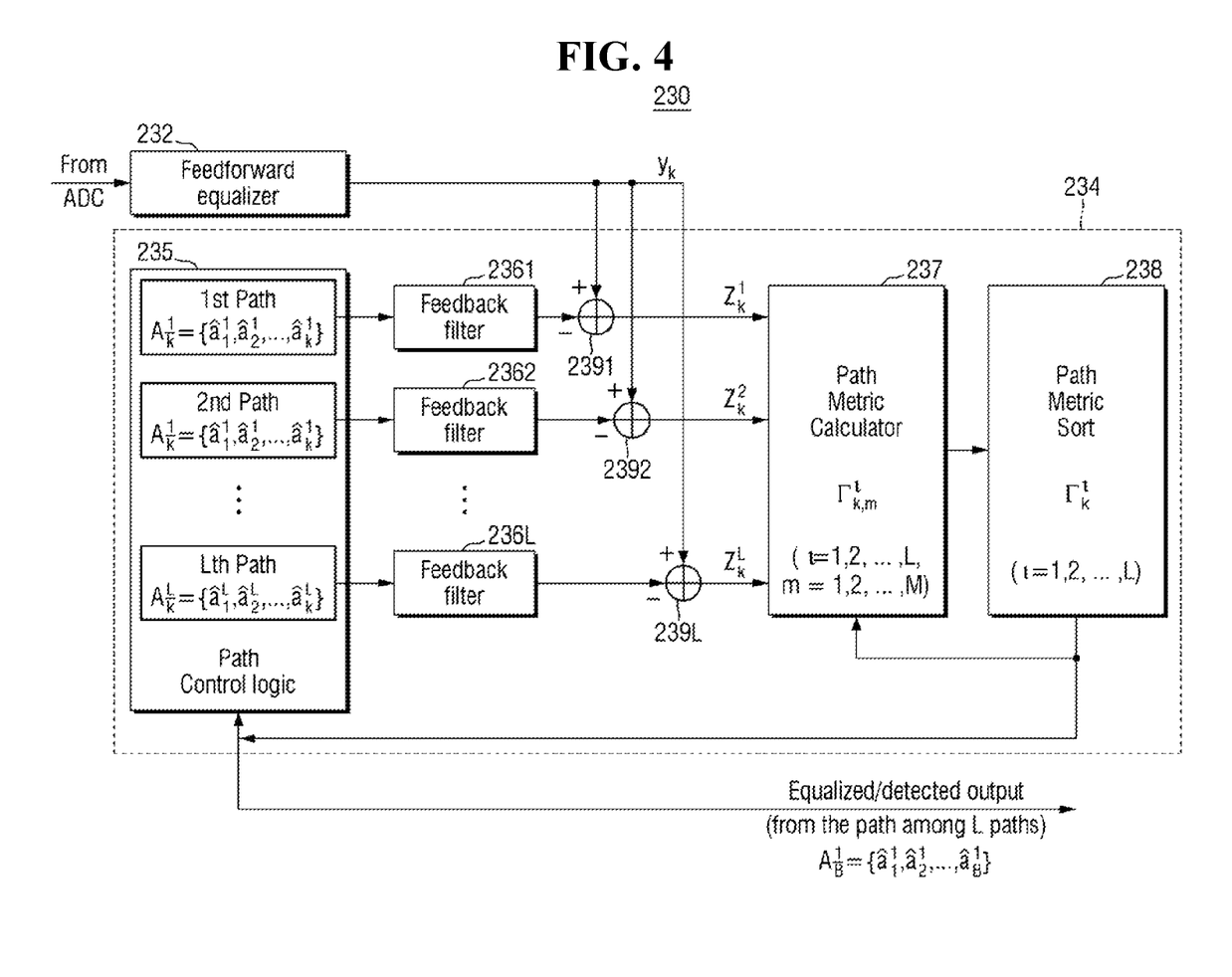
FIG. 4 is a block diagram of an equalizer of FIG. 1.
Figure 5:
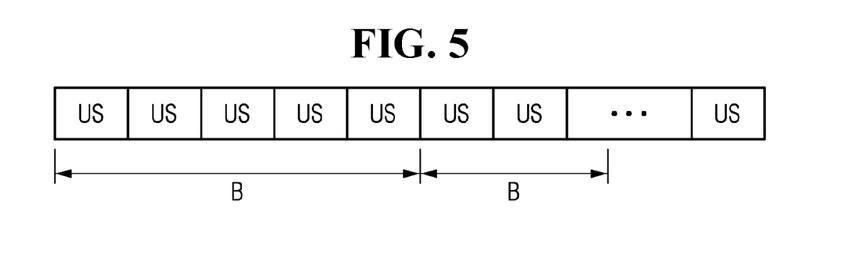
FIG. 5 is a block diagram illustrating a configuration of determining unit symbols in a block basis.

FIG. 3 illustrates the characteristics of a channel of FIG. 1. FIG. 4 illustrates an equalizer of FIG. 1. FIG. 5 illustrates a configuration for determining unit symbols on a block basis.

In the following, description will be continued on the assumption that the channel CH of FIG. 1 has the characteristics shown in FIG. 3, but this is merely an example used to explain the technical spirit of the present disclosure, and embodiments are not limited thereto.

FIG. 3 shows weights or magnitudes of inter-symbol interference for post-cursors PC as the unit periods UI or time elapses in a channel CH.

When the current time point is regarded as when the unit period UI is considered from a time point of 0, for example, data received by the reception device RX through the channel CH at the current time point may include the unit symbol US transmitted from the transmission device TX as well as inter-symbol interference.

When the channel CH has the characteristics shown in FIG. 3, the data received by the reception device RX through the channel CH at a time point of 0, for example, may include the inter-symbol interference for the unit symbols US transmitted through the channel CH before a time point D, where D is a natural number which represents a maximum delay spread.

The inter-symbol interference may include interference as much as a weight f0 by the unit symbols US transmitted at the time point of 1 which was 1 unit period UI before the time point of 0, interference as much as a weight f1 by the unit symbols US transmitted at the time point of 2 which was 2 unit periods UI before the time point of 0, interference as much as a weight f2 by the unit symbols US transmitted at the time point of 3 which was 3 unit periods UI before the time point of 0, and interference as much as a weight f(D−1) by the unit symbols US transmitted at the time point of D which was D unit periods UI before the time point of 0.

That is, the data received by the reception device RX through the channel CH when the unit period UI is at a time point of 0 may include the unit symbol US transmitted by the transmission device TX and interference by the unit symbols US transmitted through the channel CH during the D unit period UI.

When the inter-symbol interference is removed, the unit symbol US transmitted by the transmission device TX may be correctly determined.

Referring to FIG. 4, the List DFE 234 of the equalizer 230 may include path control logic 235, feedback filters 2361 to 236L, operators 2391 to 239L, a path metric calculator 237, and a path metric sorter 238.

When the output of the FFE 232 of the equalizer 230 is $y_k$, $y_k$ may be expressed as Equation 1 below.

$$y_k = a_k + f_0 a_{k-1} + f_1 a_{k-2} + \ldots + f_{D-1} a_{k-D} + n_k \quad \text{(EQN. 1)}$$

Here, $y_k$ is a signal sample received by the reception device RX at a time point k (e.g., UI=k), and $a_k$ is the original data of the unit symbol US transmitted by the transmission device TX at the time point k.

$f_k$ is the magnitude or post-cursor (PC) weight of the inter-symbol interference at each time point k shown in FIG. 3, and $n_k$ is a thermal noise. D is a maximum delay spread depending on the characteristics of the channel CH.

One method for removing the inter-symbol interference from $y_k$ is performing a slicing (hard decision) with respect to $z_k$, from which the inter-symbol interference has been removed, calculated as in Equation 2 below to detect $\hat{a}_k$, which is an estimation result for $a_k$, and utilizing the detected $\hat{a}_k$ when calculating $z_{k+1}$ in order to estimate $a_{k+1}$ at a time point k+1 immediately following the time point k.

$$z_k = y_k - (f_0 \hat{a}_{k-1} + f_1 \hat{a}_{k-2} + \ldots + f_{D-1} \hat{a}_{k-D}) \quad \text{(EQN. 2)}$$

In this method, $\hat{a}_k$ from which the inter-symbol interference at the time point k has been removed is detected and determined as the unit symbol US transmitted by the transmission device TX at the time point k (i.e., the restored multi-level signal MSR in FIG. 1 is determined and generated), the determined $\hat{a}_k$ is used to calculate an estimated value at the time point k+1. That is, this method is a method of generating the restored multi-level signal MSR for each unit symbol US (e.g., a method using a DFE algorithm).

However, when the value detected at the time point k is not accurate (i.e., when the restored multi-level signal MSR generated at the time point k is not accurate), the error that occurred at that time continuously affects the subsequent time points k+1, k+2, and the like (error propagation).

On the other hand, in order to prevent such error propagation, $\hat{a}_k$ from which the inter-symbol interference at the time point k has been removed is detected, but is not determined as the unit symbol US transmitted by the transmission device TX (i.e., the restored multi-level signal MSR is not generated), and a symbol path defined by detected values may be continuously expanded for a certain period, such as a method using a Maximum Likelihood Sequence Detection (MLSD) algorithm. In this case, the detection accuracy of each unit symbol US in the reception device RX may increase, but as the symbol path lengthens, the amount of computation that has to be performed in the reception device RX increases exponentially, and the size of a data storage space of the reception device RX for assisting such computation may also be increased.

Therefore, the equalizer 230 according to the present embodiment may use a data restoration method capable of improving the detection accuracy of the unit symbol US transmitted by the transmission device TX without excessively increasing the computational amount of the reception device RX. This will be described in more detail below.

The path control logic 235 may store L symbol paths which are predetermined, where L is a natural number equal to or greater than 2. Here, L is the number of symbol paths maintained by the List DFE 234, while the number of the unit symbols US corresponding to one block, which will be described in more detail below, is received. Such L may be determined in a range of, e.g., equal to or greater than 2 and less than $M^B$. Here, M is the number of signal levels that the unit symbol US can have, and B is a natural number equal to or greater than 2 and is the number of the unit symbols US included in the block.

L feedback filters 2361 to 236L may calculate L inter-symbol interferences (ISI) for the L symbol paths, respectively.

L operators 2391 to 239L may remove the L inter-symbol interferences calculated by the L feedback filters 2361 to 236L from the output of the feed-forward equalizer (FFE) 232 to generate $z_k$ described in Equation 2.

The path metric calculator 237 is provided with the outputs of the L operators 2391 to 239L, and may calculate a path metric for each of the L symbol paths.

The path metric sorter 238 may sort the path metric for each of the L symbol paths calculated by the path metric calculator 237 based on a predetermined criterion. In some embodiments, the path metric sorter 238 may sort the calculated path metric for each of the L symbol paths in ascending order.

The path control logic 235 may select L values among the results of the path metric sorter 238, determine estimated values at the time point k, and update the L symbol paths for use at the time point k+1.

Hereinafter, this operation will be described in more detail as follows.

First, the size (the number of symbol paths) of the list is defined as L, and the symbol path for each component of the list is defined as $A_k^l = \{\hat{a}_1^l, \hat{a}_2^l, \ldots, \hat{a}_k^l\}$. In addition, the path metric calculated by the path metric calculator 237 is defined as $\Gamma_k^l (\Gamma_0^l = 0)$.

Since each unit symbol US of the transmission device TX may have any one of the M signal levels S1 to SM as described above, a set of symbols transmitted by the transmission device TX is defined as $\{s_1, s_2, \ldots, s_m\}$.

Here, when the multi-level signal generator 110 employs, for example, PAM4, M=4 is established, when the multi-level signal generator 110 employs, for example, PAM8, M=8 is established, and when the multi-level signal generator 110 employs, for example, PAM16, M=16 is established.

In the present embodiment, the equalizer 230 determines the unit symbols US on a block basis. That is, referring to FIG. 5, when consecutive unit symbols US as shown are received from the transmission device TX, the equalizer 230 may determine the symbols in a unit of B (where B is a natural number equal to or greater than 2) unit symbols US. As shown in FIG. 5, when B=5, the equalizer 230 determines the values of the unit symbols US in the block by setting five unit symbols US as one block. In other words, the multi-level signal MSR restored by five unit symbols US is generated. Since the operation is repeated on a block basis, k=1,2, ..., B is established.

Next, whenever an input is received from the FFE 232, the path metric calculator 237 calculates the path metric using Equation 3.

$$\Gamma_{k,m}^l = \Gamma_{k-1}^l + (z_k^l - s_m)^2, \; l=1,2,\ldots,L, \; m=1,2,\ldots,M \quad \text{(EQN. 3)}$$

Here, $z_k^l = y_k - (f_0 \hat{a}_{k-1}^l + f_1 \hat{a}_{k-2}^l + \ldots + f_{D-1} \hat{a}_{k-D}^l)$, l=1,2,..., L is established, which is the outputs of L operators 2391 to 239L.

At the time point k, since the path control logic 235 stores L paths calculated at the time point k−1, based on Equation 3, the path metric calculator 237 calculates M path metrics for each symbol path, i.e., a total of L×M path metrics.

Meanwhile, in some embodiments, whenever an input is received from the FFE 232, the path metric calculator 237 may calculate the path metric using Equation 4 below.

$$\Gamma_{k,m}^l = \Gamma_{k-1}^l + |z_k^l - s_m|, \; l=1,2,\ldots,L, \; m=1,2,\ldots,M \quad \text{(EQN. 4)}$$

When using Equation 4, the calculation complexity may be reduced compared to the case of using Equation 3.

Next, L×M results calculated by the path metric calculator 237 are sorted in ascending order using the path metric sorter 238, and L $\Gamma_{k,m}^l$ having small values and paths and symbols for the corresponding metric are selected.

If indices for the selected paths and symbols are expressed as $l_1, l_2, \ldots, l_L, m_1, m_2, \ldots, m_L$, the path metric and the list are updated by Equation 5 below and stored in the path control logic 235. That is, the L symbol paths stored in the path control logic 235 are updated.

$$\Gamma_k^l = \Gamma_{k,m_l}^{l_l}$$

$$A_k^l = A_k^{l_l} \cup \{S_{m_l}\}, \; l=1,2,\ldots,L \quad \text{(EQN. 5)}$$

Since the value of the unit symbol US is determined on a block basis, this process is continuously repeated until k=B. In addition, when k=B, one $\Gamma_{k,m}^l$ having the smallest value is selected, and a path and a symbol for the corresponding metric are selected. The selected symbol path, $A_B^l = \{\hat{a}_1^l, \hat{a}_2^l, \ldots, \hat{a}_B^l\}$, is outputted as a final result, and is used to generate the restored multi-level signal MSR (i.e., the values of the unit symbols US from the time point k=1 to the time point k=B are determined).

Figure 6:
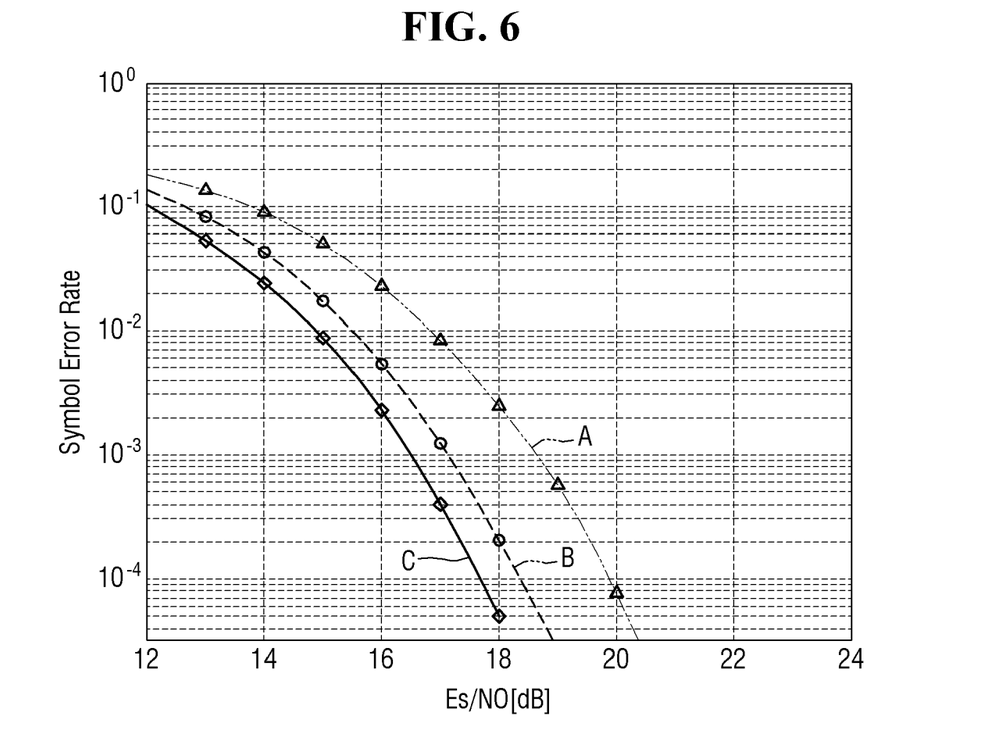
FIG. 6 is a graphical diagram describing an effect of a data receiving device according to some embodiments.

FIG. 6 illustrates an effect of a data receiving device according to some embodiments.

In FIG. 6, after transmitting a predetermined data signal, curve A shows a result of performing data restoration using the DFE algorithm, curve B shows a result of performing data restoration using a List DFE algorithm according to the present embodiment, and curve C shows a result of performing data restoration using the MLSD algorithm.

Referring to FIG. 6, it may be seen that at the same signal-to-noise ratio (Es/N0), that the List DFE algorithm according to the present embodiment has a significantly lower symbol error rate than the DFE algorithm. That is, the List DFE algorithm is superior to the DFE algorithm in at least the detection accuracy of the unit symbol transmitted by the transmission device.

At the same signal-to-noise ratio (Es/N0), the List DFE algorithm according to the present embodiment may be inferior to the MLSD algorithm in the symbol error rate, but since it maintains just L symbol paths while estimating B unit symbols US, the List DFE algorithm requires much less storage space and a significantly reduced amount of computation, compared to the MLSD algorithm. In contrast, in the case of the MLSD algorithm, as the number of received unit symbols US increases, the number of symbol paths increases exponentially, so that the amount of computation also increases exponentially.

Figure 7:
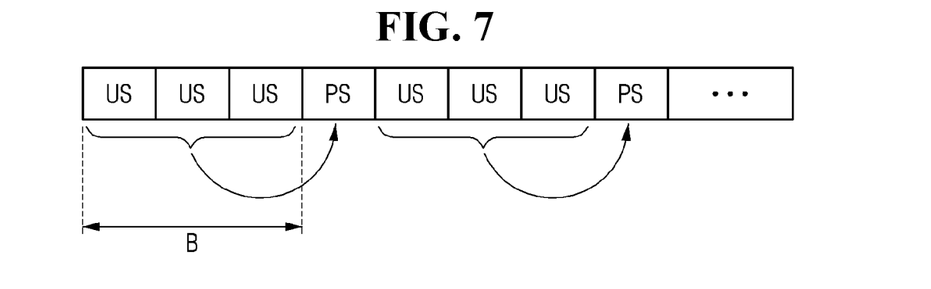
FIG. 7 is a block diagram describing a data receiving method according to some other embodiments.

FIG. 7 illustrates a data receiving method according to some other embodiments.

Hereinafter, redundant descriptions of the above-described embodiments will be omitted, and differences will be mainly described.

Referring to FIG. 7, in the present embodiment, when transmitting from the transmission device TX, a parity symbol PS is generated for each of the B unit symbols US, added at the $(B+1)^{th}$, and transmitted.

In some embodiments, the transmission device TX may perform an XOR operation on the B unit symbols US, and generate the operation result as the parity symbol PS. In addition, in some embodiments, the transmission device TX may perform a cyclic redundancy check (CRC) operation on the B unit symbols US, and generate the operation result as the parity symbol PS.

In this case, the path control logic 235 and the path metric calculator 237 repeat the process of updating the above-described L symbol paths for each unit period UI of k=1,2, ..., B. That is, in the present embodiment, even when k=B, the L symbol paths are updated instead of selecting one symbol path having the smallest path metric size. In addition, when k=B+1, the path metric calculator 237 calculates the path metric for the parity symbol PS using Equation 6 below.

$$\Gamma_{B+1}{}^l = \Gamma_B{}^l + (z_{B+1}{}^l - p_l)^2 \quad \text{(EQN. 6)}$$

Here, $p_l$ is the parity symbol PS calculated by the same method in the transmission device TX using $A_B{}^l = \{\hat{a}_1{}^l, \hat{a}_2{}^l, \ldots, \hat{a}_B{}^l\}$, and an equation $A_{B+1}{}^l = \{\hat{a}_1{}^l, \hat{a}_2{}^l, \ldots, \hat{a}_B{}^l, p_l\}$ is established.

As a result of this calculation, the path control logic 235 may output, as a final result, $A_{B+1}{}^l$ that makes $\Gamma_{B+1}{}^l$ the minimum (the smallest) and, based thereon, may generate the restored multi-level signal MRS.

In concluding the detailed description, those of ordinary skill in the pertinent art will appreciate that many variations and modifications may be made to the disclosed embodiments without substantially departing from the principles of the present disclosure. Therefore, the disclosed embodiments are provided in a broadly descriptive sense and not for purposes of limitation.

What is claimed is:

1. A data receiving device comprising:
   path control logic configured to store L symbol paths, where L is a natural number greater than or equal to 2;
   L feedback filters configured to calculate L inter-symbol interferences (ISI) for the L symbol paths, respectively;
   L operators configured to remove the L inter-symbol interferences from an output of a feed-forward equalizer; and
   a path metric calculator configured to receive outputs of the L operators and calculate a path metric for each of the L symbol paths,
   wherein the path control logic is configured to select L values among the calculated path metrics for the L symbol paths to update the L symbol paths, respectively.

2. The data receiving device of claim 1, further comprising a path metric sorter configured to sort the calculated path metric for each of the L symbol paths according to a predetermined criterion,
   wherein the path control logic is configured to select L values among results of the path metric sorter to update the L symbol paths.

3. The data receiving device of claim 2, wherein:
   the path metric sorter sorts the calculated path metric for each of the L symbol paths in ascending order, and
   the path control logic is configured to select L path metrics having small values among the calculated path metrics sorted in ascending order to update the L symbol paths.

4. The data receiving device of claim 1, wherein the path control logic receives B (where B is a natural number equal to or greater than 2) unit symbols, and generates a multi-level signal restored by the B unit symbols.

5. The data receiving device of claim 4, wherein the path control logic, when receiving the B unit symbols, selects one of the calculated path metrics for the L symbol paths, and generates the restored multi-level signal by using unit symbols included in a symbol path having the selected path metric.

6. The data receiving device of claim 1, wherein the path metric calculator calculates the path metric for each of the L symbol paths by the following equation:

$$\Gamma_{k,m}{}^l = \Gamma_{k-1}{}^l + (z_k{}^l - s_m)^2, \; l=1,2, \ldots, L, \; m=1,2, \ldots, M$$

where $z_k{}^l = y_k - (f_0 \hat{a}_{k-1}{}^l + f_1 \hat{a}_{k-2}{}^l + \ldots + f_{D-1} \hat{a}_{k-D}{}^l)$, $l=1,2, \ldots, L$, M is the number of signal levels the unit symbol can have, Sm is a value of the unit symbol, D is a maximum delay spread depending on channel characteristics, $f_k$ is a magnitude of inter-symbol interference at time point k, and $\hat{a}_k$ is an estimated value of the data receiving device for original data ($a_k$) of the unit symbol transmitted by a transmission device at time point k.

7. The data receiving device of claim 1, wherein the path metric calculator calculates the path metric for each of the L symbol paths by the following equation:

$$\Gamma_{k,m}{}^l = \Gamma_{k-1}{}^l + |z_k{}^l - s_m|, \; l=1,2, \ldots, L, \; m=1,2, \ldots, M$$

where $z_k{}^l = y_k - (f_0 \hat{a}_{k-1}{}^l + f_1 \hat{a}_{k-2}{}^l + \ldots + f_{D-1} \hat{a}_{k-D}{}^l)$, $l=1,2, \ldots, L$, M is the number of signal levels the unit symbol can have, Sm is a value of the unit symbol, D is a maximum delay spread depending on channel characteristics, $f_k$ is a magnitude of inter-symbol interference at time point k, and $\hat{a}_k$ is an estimated value of the data receiving device for original data ($a_k$) of the unit symbol transmitted by a transmission device at time point k.

8. The data receiving device of claim 1, wherein the path control logic receives B (where B is a natural number equal to or greater than 2) unit symbols and a parity symbol, and generates a multi-level signal restored by the B unit symbols using the parity symbol.

9. The data receiving device of claim 8, wherein the parity symbol is XOR operation data of the B unit symbols.

10. The data receiving device of claim 8, wherein the parity symbol is cyclic redundancy check (CRC) operation data of the B unit symbols.

11. A data receiving device comprising:
a feed-forward equalizer configured to receive a multi-level signal through a channel; and
a list-decision feedback equalizer configured to generate a restored multi-level signal using an output of the feed-forward equalizer, wherein the list-decision feedback equalizer calculates inter-symbol interferences (ISI) respectively for L symbol paths, where L is a natural number equal to or greater than 2,
wherein after removing the L inter-symbol interferences from the output of the feed-forward equalizer, the list-decision feedback equalizer calculates a path metric for each of the L symbol paths, and
wherein the list-decision feedback equalizer generates the restored multi-level signal by repeating an operation of selecting L values among the calculated path metrics for the L symbol paths to update the L symbol paths.

12. The data receiving device of claim 11, wherein:
the multi-level signal received through the channel includes a first block including B (where B is a natural number equal to or greater than 2) unit symbols, and a second block including the B unit symbols, and
the list-decision feedback equalizer generates a first restored multi-level signal including B unit symbols included in the first block after receiving the B unit symbols included in the first block.

13. The data receiving device of claim 12, wherein after generating the first restored multi-level signal, the list-decision feedback equalizer generates a second restored multi-level signal including B unit symbols included in the second block after receiving the B unit symbols included in the second block.

14. The data receiving device of claim 11, further comprising an analog-to-digital converter configured to convert an analog multi-level signal received through the channel into a digital signal and to provide the digital signal to the feed-forward equalizer.

15. A data receiving method comprising:
storing L symbol paths, where L is a natural number equal to or greater than 2;
calculating L inter-symbol interferences (ISI) for the L symbol paths, respectively;
calculating a path metric for each of the L symbol paths after removing the L inter-symbol interferences from an output of a feed-forward equalizer; and
selecting L values among the calculated path metrics for the L symbol paths to update the L symbol paths.

16. The data receiving method of claim 15, further comprising sorting the calculated path metric for each of the L symbol paths according to a predetermined criterion,
wherein the updating of the L symbol paths comprises selecting L values among sorting results to update the L symbol paths.

17. The data receiving method of claim 15, wherein the updating of the L symbol paths comprises, when receiving B unit symbols, selecting one of the calculated path metrics for the L symbol paths, and generating a restored multi-level signal by using symbols included in a symbol path having the selected path metric.

18. The data receiving method of claim 15, wherein the updating of the L symbol paths comprises receiving B (where B is a natural number equal to or greater than 2) unit symbols and a parity symbol, and generating a multi-level signal restored by the B unit symbols using the parity symbol.

19. The data receiving method of claim 18, wherein the parity symbol is XOR operation data of the B unit symbols.

20. The data receiving method of claim 18, wherein the parity symbol is cyclic redundancy check (CRC) operation data of the B unit symbols.

* * * * *